(12) United States Patent
Barker

(10) Patent No.: US 6,513,136 B1
(45) Date of Patent: Jan. 28, 2003

(54) COMMUNICATIONS RECEIVER ARRANGEMENT

(75) Inventor: Andrew J. Barker, Nottingham (GB)

(73) Assignee: Marconi Communications Limited, Coventry (GB)

( * ) Notice: Subject to any disclaimer, the term of this patent is extended or adjusted under 35 U.S.C. 154(b) by 0 days.

(21) Appl. No.: 09/432,317

(22) Filed: Nov. 2, 1999

(30) Foreign Application Priority Data

Sep. 18, 1999 (GB) ............................................. 9922016

(51) Int. Cl.[7] .......................... G06F 11/00; G01R 31/30; H04B 17/00
(52) U.S. Cl. ......................... 714/704; 714/745; 375/224
(58) Field of Search ................................. 714/704, 746, 714/755, 745, 719, 820, 821; 375/214, 213, 220, 224, 226, 227, 286, 287, 288, 296

(56) References Cited

U.S. PATENT DOCUMENTS 4,823,360 A  4/1989  Tremblay et al.
4,968,955 A  * 11/1990  Yoshida et al. ............. 329/304

FOREIGN PATENT DOCUMENTS

JP         5-342774       12/1993

* cited by examiner

*Primary Examiner*—Christine T. Tu
(74) *Attorney, Agent, or Firm*—Kirschstein, et al.

(57) ABSTRACT

A receiver in a digital communications system, in which the digital data occupy a number of levels, equalises the erroneous-count rates for the various data levels by deriving the count rates for the levels, comparing these count rates with each other and using the comparison result to adjust the threshold level which is used to detect the received data train. The error-counts are preferably derived as a byproduct of a Forward Error Correction system already available for performing normal error correction on the received data. The receiver arrangement is envisaged to find predominant application in a two-level system involving logical "1"'s and "0"'s, though it is applicable also to systems with three or more levels.

15 Claims, 3 Drawing Sheets

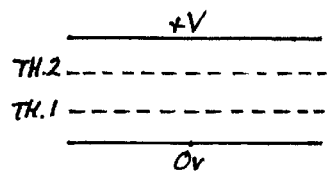
Figure 6
| LEVELS | 0 | 1 | 2 |
|---|---|---|---|
| COUNTS | 12 | 20 | 7 |
| Δ's | | +8 | -13 |
Figure 8
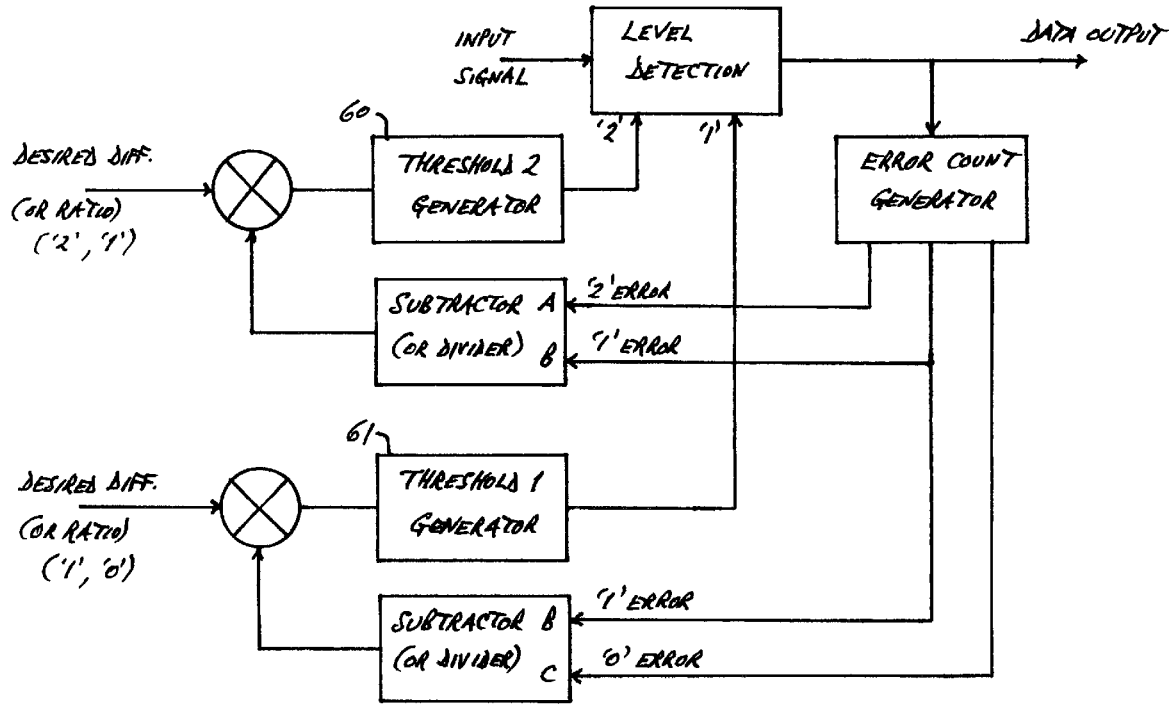
Figure 7

COMMUNICATIONS RECEIVER ARRANGEMENT

BACKGROUND OF THE INVENTION

The invention relates to a communications receiver arrangement for the receipt of digital data, in particular, but not exclusively, digital data communicated over an optical-fibre medium.

Optical transmission systems require a conversion from electrical to optical signals at the transmit end and from optical to electrical signals at the receive end. The receive end is required to carry out a clock-recovery and data-detection process, the latter providing a discrimination between the logic levels involved, i.e. logic "1"'s and "0"'s in the two-level system normally employed. To achieve this it is necessary for the receiver to generate a threshold level in order to determine whether the input signal is at any one time a "1" or a "0". Due to the low levels involved at the receive end and the effects of noise and distortion, it is difficult to decide what the threshold level should be to produce reliable detection.

FIG. 1 illustrates this problem and shows on the lefthand side the logic levels of the transmitted signal, in which logic "1" is at +5V and logic "0" is at slightly above 0V, i.e. a difference of almost 5V between the two levels. In both cases there will be a small amount of uncertainty in the levels due to noise. Due to non-ideal transmission conditions down an optical link by the time the signal reaches a receiver it might look more like the situation on the righthand side of the drawing, where the difference between the two logic levels is very much less than the original difference at transmission. The difference due to distortion could be as little as 200 mV. There is also a pronounced lack of symmetry in the distortion effect, which is common in these communications systems. If now the receiver has a fixed threshold level of around 2.5V or even higher, due to the large amount of noise present on the received signal and the much reduced difference in logic voltage levels, it is likely that some "1"'s will drop below this threshold and be read as "0"'s. A fewer number of "0"s will also be misread as "1"'s. The result will be errors in data detection, but more importantly there will be inequalities in these errors; in the example given, there will be more false "0" readings than false "1" readings. It is considered desirable to have a system in which the number of errors for the two levels is approximately equal.

SUMMARY OF THE INVENTION

In accordance with a first aspect of the invention, there is provided a communications receiver arrangement for the receipt of digital data, comprising: means for receiving digital data encoded in accordance with multiple encoding levels, means for establishing one or more thresholds for detecting the multiple encoding levels, and means for determining the error rate associated with each individual encoding level, the threshold-establishing means comprising a threshold-optimisation means for optimising the one or more thresholds on the basis of the determined error rates.

The threshold-optimisation means may comprise means for comparing the various error rates and means for changing the one or more thresholds on the basis of the comparison result. The comparing means may form a ratio between the various error rates, in which case the threshold-changing means will vary the one or more thresholds until respective predetermined ratios are established between the error rates; alternatively, the comparing means may form a difference between the various error rates, in which case the threshold-changing means will vary the one or more thresholds until respective predetermined differences are established between the error rates. The predetermined ratios may be approximately unity and the differences approximately zero.

The number of encoding levels may be two.

There may be a single threshold discriminating between the two levels. A hysteresis is preferably provided in the threshold in order to provide stability of control.

Preferably the error rates are provided as a by-product of an error-correction system, e.g. a Forward Error Correction system.

In a second aspect of the invention, a method for equalising the spurious-count rates for each of multiple data-encoding levels in a communications receiver comprises: receiving data encoded in accordance with the multiple encoding levels, determining the spurious-count rates, and optimising, on the basis of the determined spurious-count rates, one or more thresholds for detecting the multiple encoding levels.

BRIEF DESCRIPTION OF THE DRAWINGS

Embodiments of the invention will now be described, by way of example only, with the aid of the accompanying drawings, of which:

FIG. 6 is a diagram showing in conceptual form a three-level digital communications arrangement;

FIG. 7 is a block diagram of an embodiment of the invention as applied to the three-level arrangement of FIG. 6, and FIG. 8 is a table of specimen error-count figures to assist in an explanation of the mode of operation of the embodiment of FIG. 7.

DETAILED DESCRIPTION OF EMBODIMENTS OF THE INVENTION

Figure 1:
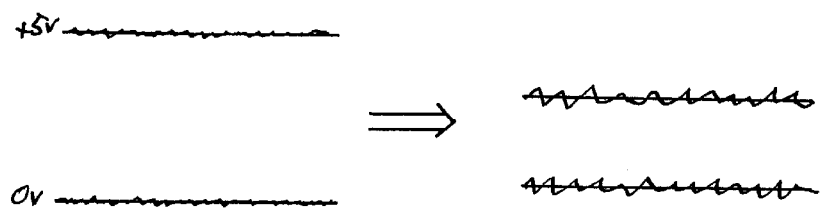
FIG. 1 is a diagram illustrating the effect of noise and distortion on a fibre-transmitted digital signal.
Figure 2:
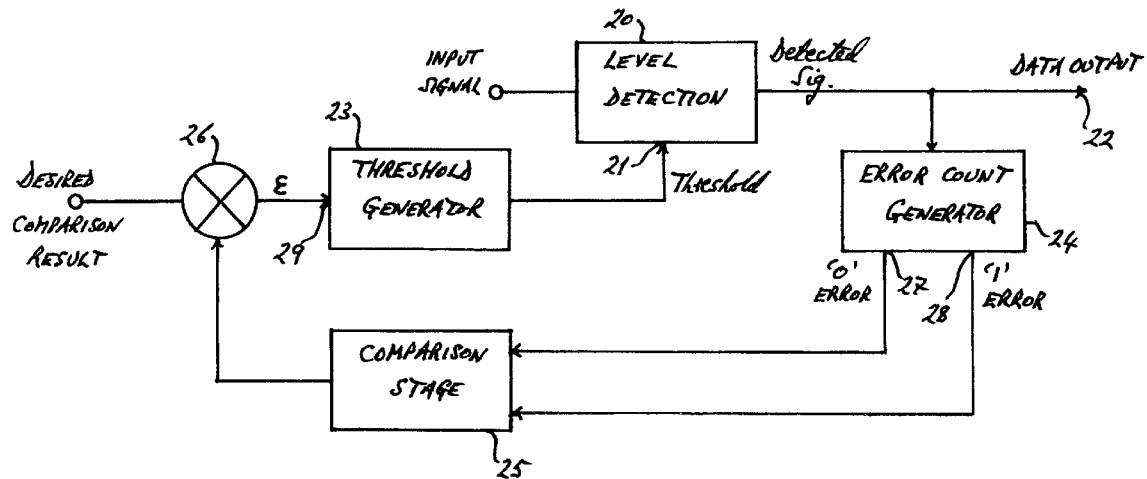
FIG. 2 is a block diagram of a communications receiver arrangement in accordance with the present invention for reducing error imbalance.

Referring now to FIG. 2, the principle of the invention in the case of a 2-level communications system will be explained. FIG. 2 includes in block-diagram form the principle components of a receiver for receiving transmitted signals containing data encoded under a two-level encoding system. The received input signal is fed to a level detection stage 20 which compares the input signal with a threshold level on an input 21. Input levels above the threshold level are detected as logic-"1"'s and those below are detected as logic-"0"'s. The data are taken to further processing circuitry on an output 22. Providing the threshold level is a threshold-level generator 23.

The present invention adds to these basic components an error-count generator 24, a comparison stage 25 and a subtraction stage 26. The error-count generator 24 monitors the data output and provides a separate count on two outputs 27, 28 of the number of spurious "0"'s and the number of spurious "1"'s (i.e. the number of erroneously read "0"'s and "1"'s, respectively). In operation, the error counts are compared in the comparison stage 25 and the result of that comparison is subtracted from a desired comparison result on the input of the subtractor 26. Subtractor 26 thus outputs an error signal $\epsilon$ which is used to alter the threshold level on an input 29 of the threshold generator 23. The system is set up so that the threshold level on the input 21 of the level-detection stage 20 is varied in a direction such as to reduce the error signal $\epsilon$ towards zero. Thus there results a substantially equal error count on the outputs 27, 28 of the error-count generator 24.

To minimise the steady-state value of $\epsilon$, the transfer function of the threshold-generator stage 23 will be arranged to have a sufficiently high gain, bearing in mind the exigencies of stability.

This schematic arrangement is advantageously realised in digital form, since the error counts will automatically be digital, rather than analogue. Thus the comparison stage 25 can be digital, as can also be the subtraction stage 26 and the threshold generator 23. Of course, some parts of the circuit may alternatively be analogue, e.g. the subtractor 26 and threshold generator 23, as may also be the threshold level itself on input 21. In that case the output of the comparison stage 25 will be fed to a digital-to-analogue converter before being taken to the subtractor 26. The desired comparison result on the other input of the subtractor 26 will likewise be an analogue level.

Figure 3:
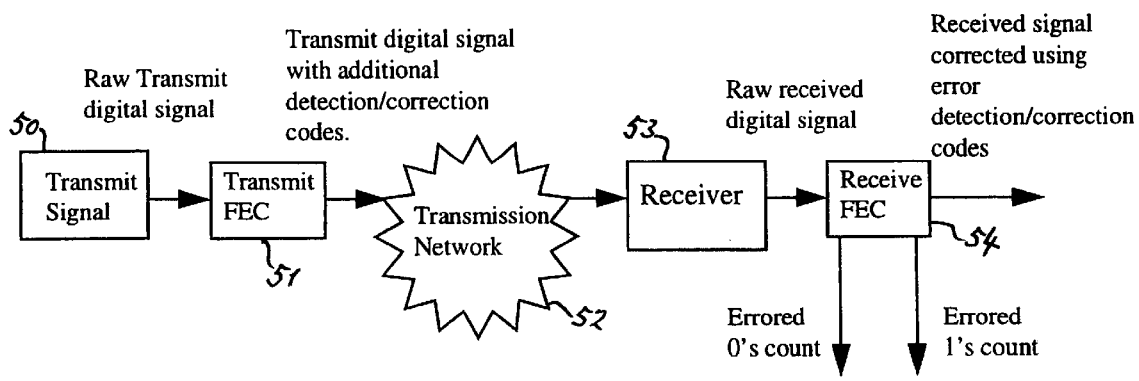
FIG. 3 shows a known Forward Error Correction system which is used in an embodiment of the invention for reducing error imbalance.

A practical digital realisation of the arrangement of FIG. 2 employs a known error-correction system to provide the error counts. Increasing bit rates on optical transmission systems result in either increased error rates over a given distance, or correspondingly shorter reaches for the same error rates, as noise and distortion effects become more pronounced. In order to address this problem, an error-correction system called Forward Error Correction (FEC) has been devised. The basic FEC system is illustrated in FIG. 3. First a signal containing digital data is produced in the block 50. Next, each word of the signal has added to it information in the form of either a wrapper, which brackets the word at its two ends, or a filler, which is inserted in spare locations within the existing data (block 51). This additional information uses established error-correction methods (e.g. Hamming codes, Reed Solomon codes) to send information relating to the signal. The data-loaded signal containing the additional FEC information is transmitted over a transmission network 52 and picked up by a receiver 53. The received signal is data-detected and is also taken to a receive FEC stage 54 which extracts the additional information and uses it to detect and also correct for errors in the received digital data stream. The result is a noticeable improvement in the perceived error performance of the transmission medium (in this case an optical fibre).

Very importantly, however, the FEC arrangement in the receiver automatically provides an indication of the number of spurious "0"'s and "1"'s that have occurred in the detection process over a given period of time. These counts are then used as inputs to the comparison stage 25 in FIG. 2.

Figure 4:
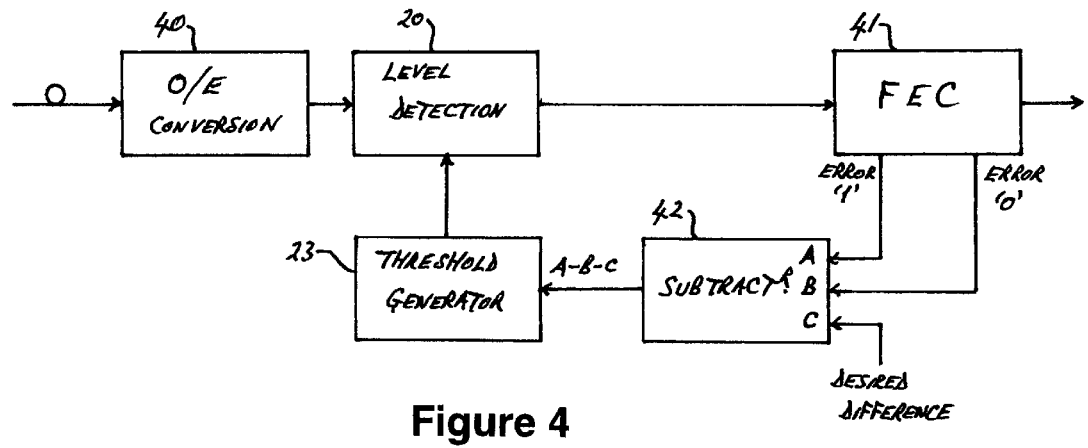
FIG. 4 illustrates a first embodiment of the invention using the Forward Error Correction system.

FIG. 4 shows an embodiment of the invention involving the use of an FEC scheme as just described. The receiver comprises an optical-to-electrical converter stage 40 which converts the incoming optical-fibre light signal into an electrical signal, this signal being then level-detected in a level detector 20. A threshold generator 23 provides the digital threshold value for the level detector 20. The level detector 20 feeds an FEC stage 41 whose error counts feed two inputs A, B of a comparison stage in the form of a subtractor 42. A third input C is supplied by a reference value. The subtractor output is used to control the input of the variable threshold generator 23, the output of which supplies the threshold value for the level detector 20. The subtractor 42 forms the difference of the three quantities on its inputs, i.e. A-B-C. Input C, the reference value, represents the desired difference between the two error counts, which will normally be zero, though for any particular system the desired difference may be non-zero.

Figure 5:
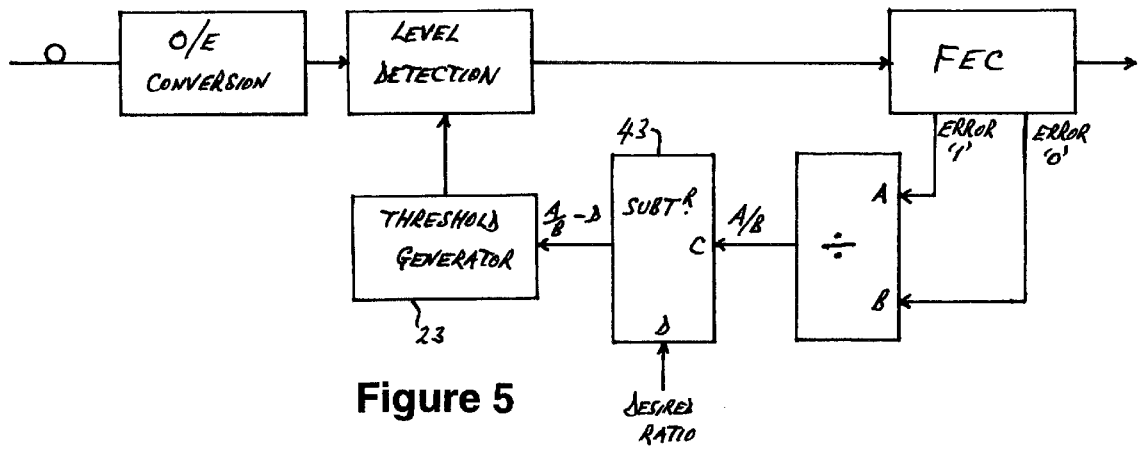
FIG. 5 illustrates a second embodiment of the invention using the Forward Error Correction system.

An alternative way of realising this arrangement is shown in FIG. 5. In this figure, instead of using a subtractor as the comparison stage, a divider is used which forms the ratio of the two error counts, i.e. a ratio A/B. The divider is connected to a subtractor 43 which subtracts the desired ratio (nominally 1) from the quantity A/B and feeds the resulting error signal $\epsilon$ to the threshold generator.

In a practical two-level system, the single threshold may be provided with a measure of hysteresis in order to enhance the stability of the detection process. The hysteresis will be fixed, i.e. there will be a fixed difference between the high and low threshold levels, and these voltage levels will move up or down in tandem as the mean threshold level is adjusted to equalise the error bit rates.

The invention is not only applicable to two-level data transmission systems, but can be employed where any number of data levels are used. FIG. 6 shows a three-level system in which data may assume any of three discrete levels between two voltage rails: a "0" level between ground and a first threshold, TH.1, a "1" level between the first threshold and a second threshold, TH.2, and a third level between the second threshold and a second supply rail (+V).

An arrangement for dealing with such a three-level system is shown in FIG. 7. FIG. 7, which is a three-level version of the two-level FIG. 2 arrangement, contains two control loops, one for each of the two thresholds concerned. Each loop comprises a comparison stage (subtractor or divider) and a variable threshold generator. The comparison stage for the first loop receives error-count values for the "0" and "1" levels and that for the second loop receives error-count values for the "1" and "2" levels.

The action of this three-level scheme can be explained with reference to FIG. 8. In FIG. 8 it is assumed that, initially, no error-equalisation system is in place, so that the error counts of the three levels are different. In the example shown (the count values are unrealistic and chosen purely for explanatory purposes), the "1" level has most errors with 20 counts, the "0" level has 12 counts and the "2" level has the least number of errors at 7 counts. The two control loops take the difference of the "2" and "1" counts, on the one hand, and of the "1" and "0" counts, on the other. This yields an input to the respective threshold generators 60, 61 of -13 and +8 counts. Generator 60 is thus driven hard in one direction, such as to lower threshold 2 considerably, while generator 61 is driven more softly in the other direction, such as to raise threshold 1 somewhat less. As can be seen by inspection, lowering threshold 2 significantly will have the effect of bringing quite a lot of data, which fell into the "1" category, up into the "2" category, while raising threshold 1 not so much will have the effect of bringing just a few data, which fell into the "1" category, down into the "0" category. The eventual result toward which the system will converge is that each level will end up with the average of the three count values, i.e. 13 counts each. In practice, convergence will occur over several sampling periods.

As a practical consideration, since many transmission systems take a finite period to settle after any adjustment, it will usually be necessary to integrate the subtraction/ratio values over a suitable length of time to ensure convergence.

As already stated, implementation of the invention can be in a mixture of digital and analogue technologies, or indeed in a mixture of hardware and software, as appropriate. Thus, comparison (subtraction/division) and threshold adjustment could be implemented in hardware, with the counts being stored within the hardware device and the values being compared within the hardware in order to generate the required threshold correction. Alternatively, the counts could be collected by software and the comparison process carried out in software, the software then correcting the thresholds. A software solution is acceptable despite potentially slower response times, since most distortions relevant to the invention on transmission systems are long-term phenomena and are not prone to rapid fluctuations.

I claim:

1. A communications receiver arrangement for receiving a communication signal of a type containing digital data which is encoded in accordance with multiple encoding levels and which includes forward error correction coding for correcting data errors in a received signal, the receiver arrangement comprising:

threshold-generating means for generating one or more thresholds for detecting data corresponding to the multiple encoding levels, means for determining an error rate associated with each individual encoding level using the forward error correction coding, the threshold-generating means comprising comparison means for comparing the error rates for the multiple encoding levels, and threshold-optimization means for changing said one or more thresholds on the basis of a comparison result generated by the comparison means to substantially equalize the error rates for the multiple encoding levels.

2. The receiver arrangement as claimed in claim 1, wherein, in use, the comparison means forms a ratio between the error rates, and wherein the threshold-optimization means varies said one or more thresholds until respective predetermined ratios are established between the error rates.

3. The receiver arrangement as claimed in claim 2, wherein the predetermined ratios are all substantially unity.

4. The receiver arrangement as claimed in claim 1, wherein, in use, the comparison means forms a difference between the error rates, and wherein the threshold-optimization means varies said one or more thresholds until respective predetermined differences are established between the error rates.

5. The receiver arrangement as claimed in claim 4, wherein the predetermined differences are all substantially zero.

6. The receiver arrangement as claimed in claim 1, wherein the encoding levels are two in number.

7. The receiver arrangement as claimed in claim 6, wherein a single threshold is used to discriminate between the two encoding levels.

8. The receiver arrangement as claimed in claim 7, wherein a hysteresis is provided in the single threshold in order to provide stability of control.

9. The receiver arrangement as claimed in claim 1, and further comprising means for correcting the received signal for the data errors using the forward error correction coding of the received signal, said correcting means being operable for determining the error rate associated with each individual encoding level.

10. A method of receiving a communication signal of a type containing digital data which is encoded in accordance with multiple encoding levels and which includes forward error correction coding for correcting data errors in a received signal, the method comprising the steps of:

a) generating one or more thresholds for detecting data corresponding to the multiple encoding levels;

b) determining an error rate associated with each individual encoding level using the forward error correction coding;

c) comparing the error rates; and d) changing said one or more thresholds on the basis of the comparing step to substantially equalize the error rates for the multiple encoding levels.

11. The method as claimed in claim 10, and comprising the steps of determining a ratio of the error rates, and changing said one or more thresholds until respective predetermined ratios are established between the error rates.

12. The method as claimed in claim 11, wherein the predetermined ratios are all substantially unity.

13. The method as claimed in claim 10, and comprising the steps of determining a difference between the error rates, and changing said one or more thresholds until respective predetermined differences are established between the error rates.

14. The method as claimed in claim 13, wherein the predetermined differences are all substantially zero.

15. The method as claimed in claim 10, and further comprising the step of correcting the received signal for the data errors using the forward error correction coding of the received signal.

\* \* \* \* \*